United States Patent
Kraemer et al.

(10) Patent No.: US 9,460,011 B1
(45) Date of Patent: Oct. 4, 2016

(54) MEMORY REFERENCE ESTIMATION METHOD AND DEVICE BASED ON IMPROVED CACHE

(71) Applicant: International Business Machines Corporation, Armonk, NY (US)

(72) Inventors: Marco Kraemer, Sindelfingen (DE); Carsten Otte, Stuttgart (DE); Christoph Raisch, Gerlingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/967,595

(22) Filed: Dec. 14, 2015

(51) Int. Cl.
*G06F 12/00* (2006.01)
*G06F 12/08* (2016.01)
*G06F 12/12* (2016.01)

(52) U.S. Cl.
CPC ....... *G06F 12/0811* (2013.01); *G06F 12/0875* (2013.01); *G06F 12/122* (2013.01); *G06F 12/128* (2013.01); *G06F 2212/283* (2013.01); *G06F 2212/452* (2013.01); *G06F 2212/621* (2013.01); *G06F 2212/69* (2013.01)

(58) Field of Classification Search
CPC ........... G06F 12/0811; G06F 12/0875; G06F 12/122; G06F 12/128; G06F 2212/283; G06F 2212/621; G06F 2212/69; G06F 2212/452
See application file for complete search history.

(56) References Cited

U.S. PATENT DOCUMENTS

| | | |
|---|---|---|
| 6,308,247 B1 | 10/2001 | Ackerman et al. |
| 7,953,953 B2 | 5/2011 | In et al. |
| 8,244,954 B2 | 8/2012 | Ganesh et al. |
| 8,352,705 B2 | 1/2013 | Agesen |
| 8,438,363 B1 | 5/2013 | Koryakin et al. |
| 2014/0089602 A1* | 3/2014 | Biswas ............... G06F 12/0804 711/144 |
| 2014/0297962 A1 | 10/2014 | Rozas et al. |

* cited by examiner

*Primary Examiner* — John Lane
(74) *Attorney, Agent, or Firm* — Cantor Colburn LLP; Margaret McNamara

(57) ABSTRACT

A computer system that includes a processor, a memory and a processor cache for the main memory with a check-in-cache instruction may be provided. The processor executes computer readable instructions stored in the memory that include receiving a check-in-cache instruction from a check-in-cache storage location. The instructions also include responsive to receiving the check-in-cache instruction, determining whether data bytes specified by the check-in-cache instruction are at least partially available in the processor cache. The instructions further include storing a condition code of the determination result in a storage location.

19 Claims, 6 Drawing Sheets

MEMORY REFERENCE ESTIMATION METHOD AND DEVICE BASED ON IMPROVED CACHE

BACKGROUND

The present invention relates generally to a computer system and memory management, and more specifically, to a computer system that includes a processor with a cache for caching main memory that is managed by an enhanced memory management system.

Virtual machine (VM) concepts allow creating and running multiple operating environments on one physical server at the same time. Because each virtual environment requires its own operating system for running applications independently, a virtualization layer (hypervisor) provides a layer between the processing, storage and/or main memory, and networking hardware and the software that runs on it. This way, information technology cost may be lowered through increased efficiency and flexibility. Each virtual environment emulates a complete hardware system. However, virtual main memory areas need to be mapped to the real physical main memory of the underlying hardware system. Therefore, memory pages in the physical main memory may be shared between different processes, e.g., of different virtual machines or other processes. Memory pages in main memory which are currently not accessed are typically moved or pushed to disk and are not present in the physical main memory.

The underlying paging algorithm goal is therefore to move non-accessed pages to disk and to move required pages to the main memory. The basic problem may be described as efficiently identifying non-access pages to free up main memory. The underlying complexity exists due to shared memory pages and main memory. The same problem exists for a mapping of main memory pages to cache systems. There are currently some solutions for memory reference tracking available in order to make paging decisions.

U.S. Pat. No. 8,438,363 B1 describes a system, a method and a computer program product for virtualizing a processor including a virtualization system running on a computer system and controlling memory pages through hardware support for maintaining real paging structures.

U.S. Pat. No. 6,308,247 B1 discloses a page table entry management method and apparatus for providing a microkernel system with the ability to program a memory management unit on a PowerPC® family of processors. The PowerPC processors define a limited set of page table entries (PTEs) to maintain virtual to physical mappings. The page table entry management method and apparatus solve the problem of a limited number of PTEs by segment aliasing when two or more user processes share the segment of the memory.

However, almost all currently available architectures do not provide 2-way accurate reference information of the active page tracking. The available implementations provide fast memory access times, but slow checking/resetting of reference information. In the well-known Intel architecture, each page table entry has a reference bit embedded. In order to find the cumulative reference status of a page or all pages, table entries need to be found which requires quite some time. Pages of some dynamic shared library objects (DSOs), e.g., libc, are found in most all address spaces and thus, have many page table entries associated with them. Another architecture, the System Z® architecture uses a reference bit in a storage key, which is associated with each physical page frame. Special-purpose instructions are required; and quiesce operations need to automatically read/set the storage key, which in terms of performance can be relatively expensive, even after an optimization.

Hence, there is a need for better management of memory pages, particularly for identifying non-accessed pages to determine infrequent accessed pages as candidates for being moved from main memory to disk on a regular basis with low computing overhead.

SUMMARY

An embodiment includes a computer system that comprises a processor, a main memory and a processor cache for the main memory may be provided. The processor can execute computer instructions for receiving a check-in-cache instruction from a check-in-cache storage location. The processor can also execute computer instructions for, responsive to receiving the check-in-cache instruction, determining whether data bytes specified by the check-in-cache instruction are at least partially available in the processor cache. The processor can further execute computer instructions for storing a condition code of the determination result in a storage location.

According to another embodiment of the present invention, a method for memory management in a computer system that comprises a processor, a main memory and a processor cache for the main memory may be provided. The method may comprise receiving a check-in-cache instruction from a check-in-cache storage location, determining, responsive to receiving the check-in-cache instruction, whether data bytes specified by the check-in-cache instruction are at least partially available in the processor cache, and storing a condition code of the determination result in a storage location.

It may be noted that the check-in-cache instruction may not read-out the addressed data. Additionally, it may be noted that the check-in-cache storage location may be the main memory.

The proposed computer system and the related method for memory management may offer a couple of advantages and technical effects:

In contrast to existing technologies embodiments of the here proposed system and method allow faster checking, eliminating the need to reset reference information for memory pages without traditional drawbacks of performance penalties due to data read-out. By adding a determination at the end of an active queue of page table entries about whether the memory page has been accessed and positioning the entry in the active list again at the top of the active queue instead of moving it to the inactive queue, memory pages are not treated as inactive pages which are managed in the inactive list.

Additionally, by adding a second determination at the end of the inactive queue of page table entries about whether the memory page has been accessed and positioning the entry in the active list again at the top of the active queue instead of moving it to disk, the management of memory content becomes much more effective. The check-in-cache instruction is key to both determinations just mentioned. The check-in-cache instruction may be issued to determine whether the page has been accessed, however, without a computation-wise expensive read-out of the data. Additionally, embodiments of the proposed technology also allow the use of traditional methods, e.g., contemporary "page dirty checks", as a second indication for the memory page management algorithm.

A further improvement may be seen that by improving the performance of a reference determination a paging rate to input/output (I/O) may be improved, which has been limited by some prior art technologies, in particular those with a large amount of memory and fast I/O-channels.

In the following, further embodiments are described:

According to one embodiment of the computer system, the storage location may be a processor register, a processor flag or a main memory location. Thus, the storage location for the condition code of the determination may be stored in any suitable place dependent on individual design criteria. There are no real design limitations for the storage location.

According to one optional embodiment of the computer system, the processor cache may comprise at least two hierarchy levels. The hierarchy level directly caching the main memory may be an inclusive cache, and the determination may be based on a determination whether the data bytes are contained in the hierarchy level directly caching the main memory. This implementation option may be one option out of at least two, as can be seen from the next embodiment.

According to this alternative embodiment of the computer system, the processor cache may comprise at least two hierarchy levels, a first and a second level, and the hierarchy level directly caching the main memory may be a non-inclusive cache. In this case, the determination may be based on a determination whether the data bytes are contained in the first hierarchy level or in the second hierarchy level directly caching the main memory. Hence, the implementation of embodiments of the inventive technology may be independent of the cache organization.

According to an embodiment of the computer system, the processor may comprise a plurality of computing nodes, each node comprising a plurality of processor chip units, each processor chip unit comprising a plurality of processing cores, wherein each computing node may comprise a local cache controller. This may define a maximum hierarchy level of processing unit design. However, the inventive concept may also work with less, or even more, hierarchy levels.

According to an optional embodiment of the computer system, the local cache controller may have priority for a determination of whether a memory page is cached. This may imply that local cache controller belonging to a computing node may check the local cache first before checking the cache controllers of other nodes.

According to an embodiment of the computer system, a determination of whether to perform a check-in-cache instruction or to perform a reference bit check for a paging decision, in particular for memory management, may be performed by an operating system module. Thus, the memory management may be controlled by software, optionally as part of an operating system.

According to an embodiment of the computer system, the determination performed by the operating system module may be dependent on a memory page turn-over rate. A threshold may be defined. If the page turn-over rate may exceed the threshold, embodiments of the memory management method may be used for relaying in the check-in-cache instruction; in case the threshold may not or may just be reached, the traditional memory management methods may be used.

According to an embodiment of the computer system, the main memory content may be managed according to a least recently used concept, thus, the memory content may be pushed to a storage device if a memory page may be inactive. Specific caching and paging algorithms may control this process.

According to an additional embodiment of the computer system, page memory table entries may be organized according to a second chance least recently used algorithm. A person skilled in the art will know that a second chance least recently used algorithm is a modified form of a FIFO ($1^{st}$ in, $1^{st}$ out) page replacement algorithm. It may fare relatively better than FIFO at little cost for the improvement. It works by looking at the front of the queue as FIFO does, but instead of immediately paging out that page, it checks to see if its referenced bit is set. If it is not set, the page may be swapped out. Otherwise, the referenced bit may be cleared, the page may be inserted at the back of the queue (as if it were a new page) and this process may be repeated. It may also be thought of as a circular queue.

According to an embodiment of the computer system, the check-in-cache instruction may return a result of a determination of an availability of a memory page or parts thereof without loading the memory page to the processor cache if the memory content is not in the processor cache. The result of the determination may be stored as a bit for further reference anywhere in the architecture.

According to a further embodiment of the computer system, in case the check-in-cache instruction result is indicative of a non-availability of the memory page or parts thereof in the processor cache or the main memory, a reference bit check is performed in the page table entries or a storage key of a physical memory page. Thus, both implementation options may use this technology. There are no architectural imitations.

According to another embodiment of the computer system, the reference bit check may only be performed in an inactive list of the page table entries or in the storage key of a physical memory page. Thus, the active list may not be checked as part of this determination resulting in a performance gain.

According to an embodiment of the computer system, the check-in-cache instruction may specify a subsequent number of data bytes stored in the main memory. This may be called the explicit form of the specification of the check-in-cache instruction because a number of subsequent data bytes may have to be specified. This may be viewed in contrast to the next embodiment, the implicit form.

According to an embodiment of the computer system, a subsequent number of data bytes stored in the main memory may be specified by the check-in-cache instruction, i.e., specified implicitly. Hence, the number of bytes may not be changed with the check-in-cache instruction. An exemplary number of implicitly specified bytes—without being limited to this number of bytes in this example—may, e.g., be 4 kB. However, this implementation may not be as flexible as the one described before having the explicit form, because the number of bytes after an address specified by the check-in-cache may be fixed.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
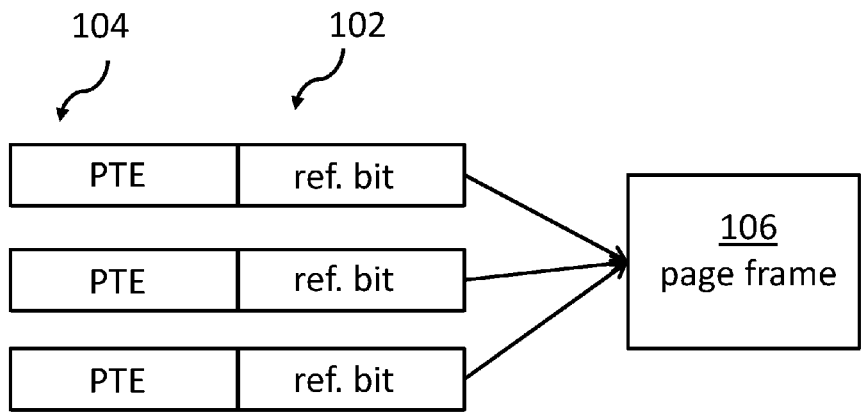
FIG. 1 shows a block diagram of technology for memory management using a reference bit embedded in the page table entry for a single page frame.

In the context of this description, the following conventions, terms and/or expressions may be used:

The term 'processor' may denote a central processing unit (CPU), like a general purpose CPU, of a computer system. This may also include specific processors like graphic processing units (GPUs), accelerators, or other signal processing units.

The term 'main memory' or 'memory' may denote, e.g., random access memory (RAM) as used in virtually every computer system for storing data and executing program code. In typical cases, the main memory may lose its stored information in case of a power off.

The term 'processor cache' may denote a specific memory area of memory cells, typically geometrically located close to the processor, to enable a fast access to data in the cache if compared to an access of data in the main memory. One task of the operating environment is to ensure that the cache may be consistent with the content of the main memory. A person skilled in the art will be knowledgeable about different kinds of caching algorithms. There may be different cache hierarchy levels in a processing system; e.g., L1 to L4 caches, whereat the letter "L" stands for the level of the cache.

The term 'check-in-cache instruction' may denote a new form of an instruction, instrumental for an improved memory management. The check-in-cache instruction may return a result indicative of specific data being in a specific cache without accessing the individual memory cells, i.e., without reading the data out.

The term 'storage location', in particular for storing a reference of a determination result of whether a page has been accessed, may denote here, a storage location allowing a fast access by the processor on the caching algorithms in general. Therefore, options for the storage location, e.g., for a specific determination, and thus, just one bit, may be a processor register or a part thereof, a processor flag or, a main memory location, e.g., as part of a longer processor status word.

The term 'hierarchy level', in particular hierarchy levels of caches, may denote how close cache cells of a certain level may be to a processing unit. The smaller the number of the cache level, the closer the memory cells of that cash level are to the processing unit. Thus, L1 cache may be accessed instantaneously by a processing unit, because the two elements are located as close as possible to each other for immediate data access.

The term 'inclusive cache' may denote a cache design in which all data in the cache level, having a lower number than another cache level, are also comprised in a cache having a higher level number; i.e., in an inclusive cache all data of an L1 cache are also be comprised somewhere in a corresponding L2 cache. This may also be called "strictly inclusive". This strict order is not implemented in a 'non-inclusive cache'. The advantage of exclusive caches may be that they store more data. This advantage may be bigger when the exclusive L1 cache is comparable to the L2 cache, and may be diminished if the L2 cache is many times larger than the L1 cache. When the L1 cache may miss and the L2 cache may hit on an access, the hitting cache line in the L2 cache is exchanged with a line in the L1. This exchange may be quite a bit more work than just copying a line from L2 cache to a L1 cache, which is what an inclusive cache does.

In the following, a detailed description of the figures will be given. All instructions in the figures are schematic. Firstly, a block diagram of a known memory management method may be described. Afterwards, different embodiments of the proposed computer system using the check-in-cache instruction as well as embodiments of the method for memory management in a computer system will be described.

FIG. 1 shows a block diagram of contemporary technology for memory management using a reference bit 102 embedded in the page table entry 104 for a single page frame 106. In order to find a cumulative reference status of a memory page, all page table entries need to be found and examined. This may be quite time consuming. Pages of some dynamically shared objects (DSO), like libc, may be found in pretty much all address spaces of all virtual machines running on a physical processor. Thus, they all may have page table entries associated with it. The required overhead of this traditional technology can be relatively large.

Figure 2:
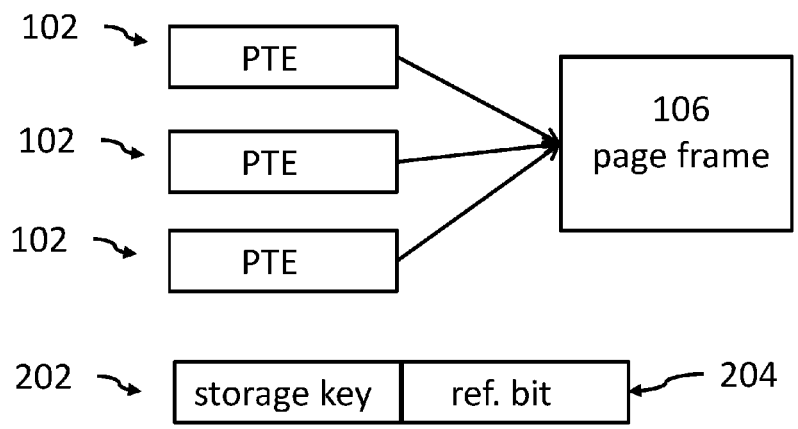
FIG. 2 shows a memory management using a storage key.

FIG. 2 shows a memory management using a storage key, such as that used by System z central execution complexes (CECs). A storage key 202 which may also include an associated reference bit 204. The storage key 202 with the reference bit 204 may be associated with each physical page frame, indicative of a change of the stored content of that page frame. Special purpose instructions may be required to read the reference bit. For example, quiesce operations can be used to atomically read/set the storage key.

Figure 3:
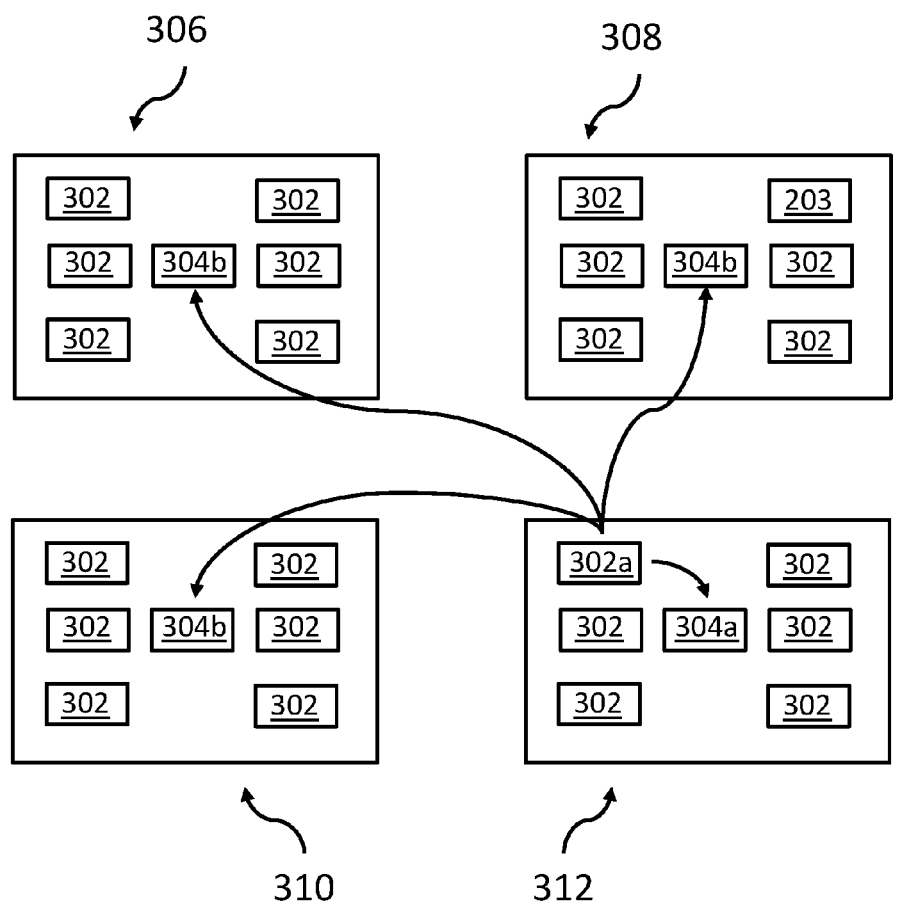
FIG. 3 shows substantial components of a larger CPU with 4 nodes in accordance with some embodiments of this disclosure.

FIG. 3 shows a substantial part of a larger CPU. Four processor or computing nodes 306, 308, 310, 312 are shown. The IBM System z architecture may be used as example. Each of the computing nodes 306, 308, 310, 312 may comprise a plurality of processing units 302. Each processing unit 302 may comprise a plurality of cores (not shown). In case of the IBM System z architecture each processing unit 302 may manage its own level 1 (L1), level 2 (L2) and level 3 (L3) cache. Other processor architectures may have a different number of levels of caches as well as a different number of hierarchy levels inside the processing units.

As shown, each computing node 306, 308, 310, 312 may have a dedicated cache controller 304a, 304b responsible for communication and data exchange between a last level cache, in the example of the System z L4 cache, and the main memory. The differentiation between cache controller 104a and the cache controllers 304b is made because embodiments may ensure that a local cache controller 104b may be checked first before a request is issued to cache controllers 104a of other computing nodes 306, 308, 310. Thus, if processing unit 302a needs a memory page (not shown) in its cache, the local cache controller 304a is checked first before the other cache controllers 304b are checked.

The other "remote" cache controllers 304b are only checked if parts of the memory page is not cached locally, i.e., controlled by cache controller 304a. A page with no data resident in cache is considered to be inactive.

Figure 4:
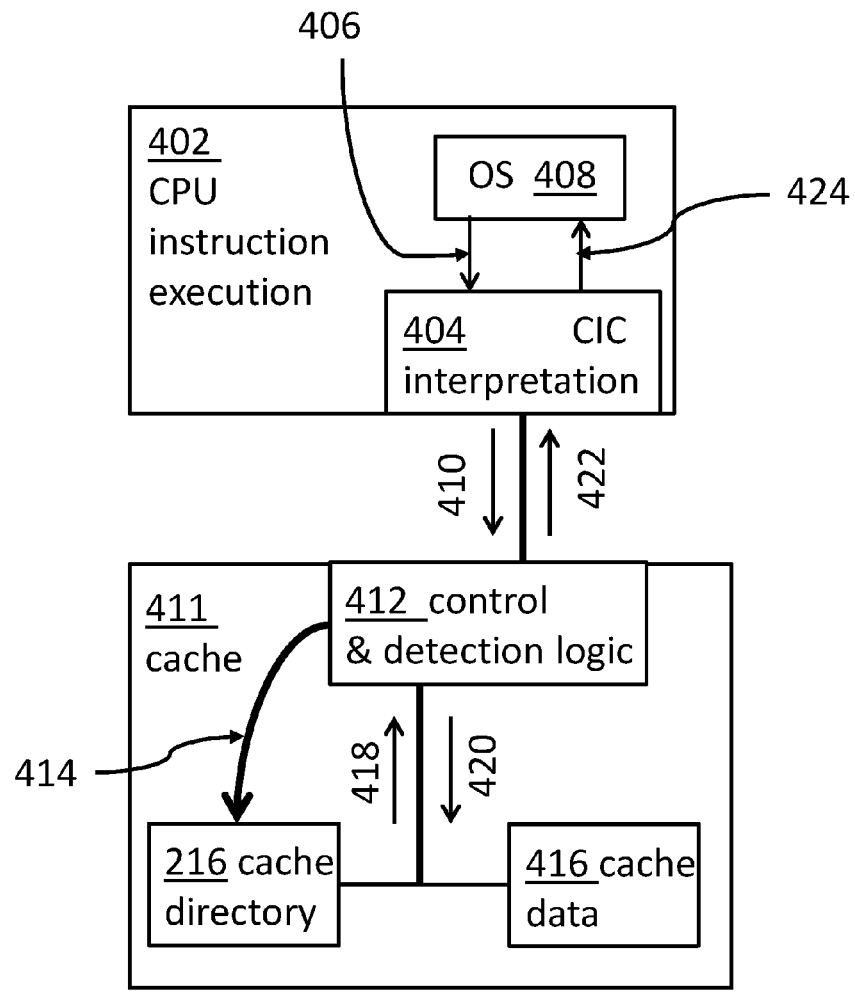
FIG. 4 shows a block diagram of how an operating system uses a check-in-cache instruction for a memory management in accordance with some embodiments of this disclosure.

FIG. 4 shows a block diagram how an operating system can use a check-in cache instruction for memory management in accordance with embodiments. In the block 402 "CPU instruction execution" unit, a check-in-cache instruction 404 is issued 406, and operating system 408 controlled. The instruction execution unit 402 may recognize the new check-in-cache instruction. The check-in-cache instruction may comprise the address to be verified. The check-in-cache instruction 404 interpretation forwards 410 the address and the page size to the control and detection logic 412 of the cache 411. The control and detection logic 412 starts 414, and a cache 416 directory lookup on the memory page granularity is performed. The control and detection logic 412 tracks 418 if the cache directory look-up did succeed. If "yes" it suppresses a read-out of the cache data 420. The control and detection logic 412 then returns 422 hit/miss information to the check-in-cache instruction 404 as a return value. Finally, the check-in-cache instruction 404 continues and returns 424 the result as status back to the operating system 408. The operating system 408 algorithm acts then accordingly.

Figure 5:
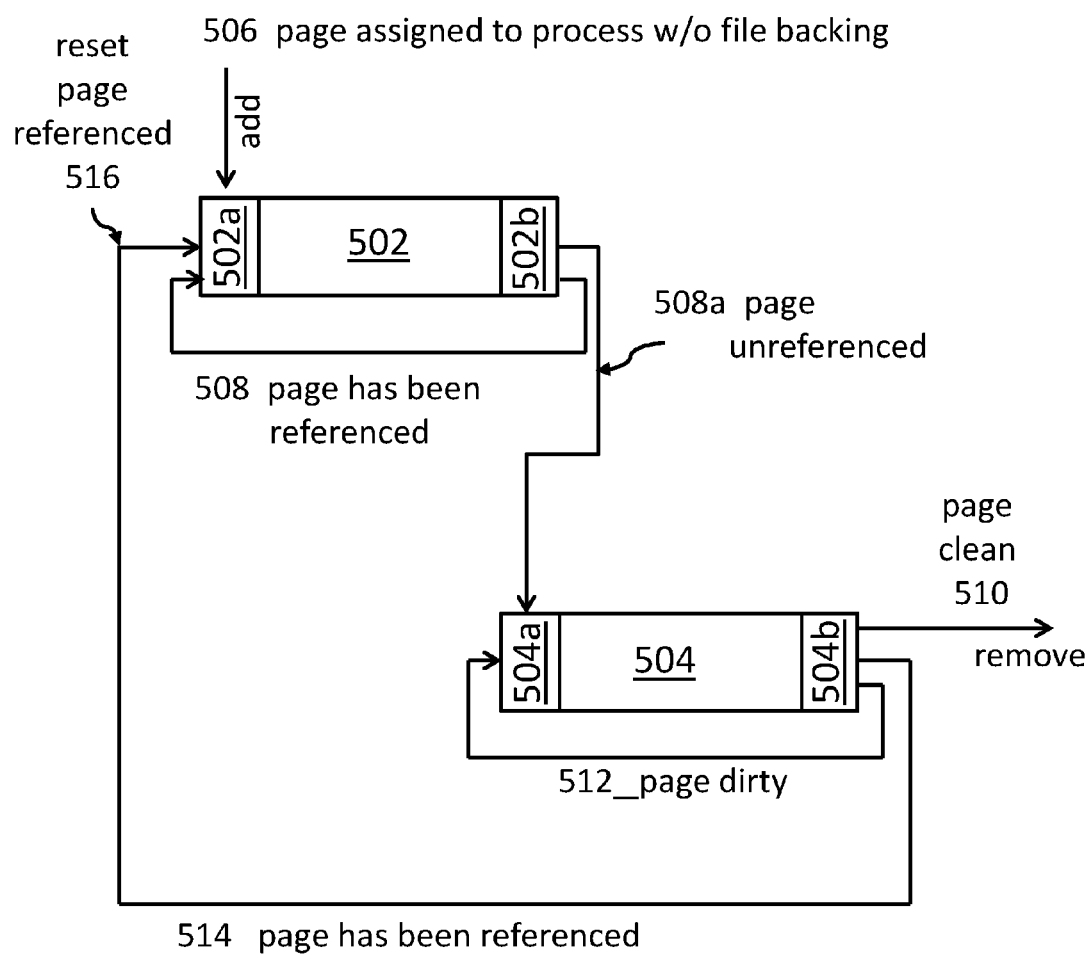
FIG. 5 shows an embodiment of a memory management using an active queue and an inactive queue for page table entries in accordance with some embodiments of this disclosure.

FIG. 5 shows an embodiment of a memory management using active queue 502 for page table entries in accordance with embodiments. At the head 502a of the active queue 502, a page address assigned 506 to a process without a file backing is added to active queue 502. Over time, more and more references to memory pages are added to the active queue 502. Thus, earlier added references are moved, step by step, through the queue in the direction of the tail 502b of the active queue 502. From here, a reference to a memory page may be moved to the head 504a of the inactive queue 504. However, in accordance with embodiments, it may be checked using the check-in-cache instruction whether the corresponding memory page has been referenced 508. If that is the case, the memory page reference entry is again added to the head 502a of the active queue 502. Thus, the movement of the reference for the memory page to the inactive queue 504 may only be performed if the corresponding page has not been referenced, 508a.

The movement of the references for memory page through the inactive queue 504 is done in a comparable way to the movement of references for memory page through the active queue 502. If a new entry is added at the head 504a, the rest of the inactive queue 504 is moved one position to the right (in the diagram shown in FIG. 5).

At the tale 504b of the inactive queue 504, a reference for a memory page may be removed 510 in case a memory page is clean, meaning that the reference for the memory page is simply moved out of the queue. "Clean" may denote here that the cache entries and the main memory entries correspond to each other. The cache memory cells have not been modified if compared to the corresponding main memory cells. In case the corresponding memory page is changed (dirty), the reference for the memory page is again moved 512 to the head 504a of the inactive queue 504. However, the check-in-cache instruction comes into play and if the corresponding page has been referenced 512 (dirty page), the reference for the memory page is again moved 514 to the head 502a of the active queue 502. In that case, another action may be required, i.e., a reset, 516, of the page referenced bit of the reference for the corresponding memory page in the active queue 502.

It may be noted that before a reference for a memory page is moved from the tail 502a or 504b of the respective queue 502, 504, a check-in cache instruction is executed under the control of the operating system, controlling the memory management process. However, in case of the determination at the tail 504b of the inactive queue 504, a check-in-cache instruction may be executed first. If the check-in-cache result is negative, the "dirty check" is triggered. If the check-in-cache instruction returns a positive result, no reference check is performed. The result of the "dirty check" may also return a prior art reference check, which is used as a second indication for the caching algorithm.

Figure 6:
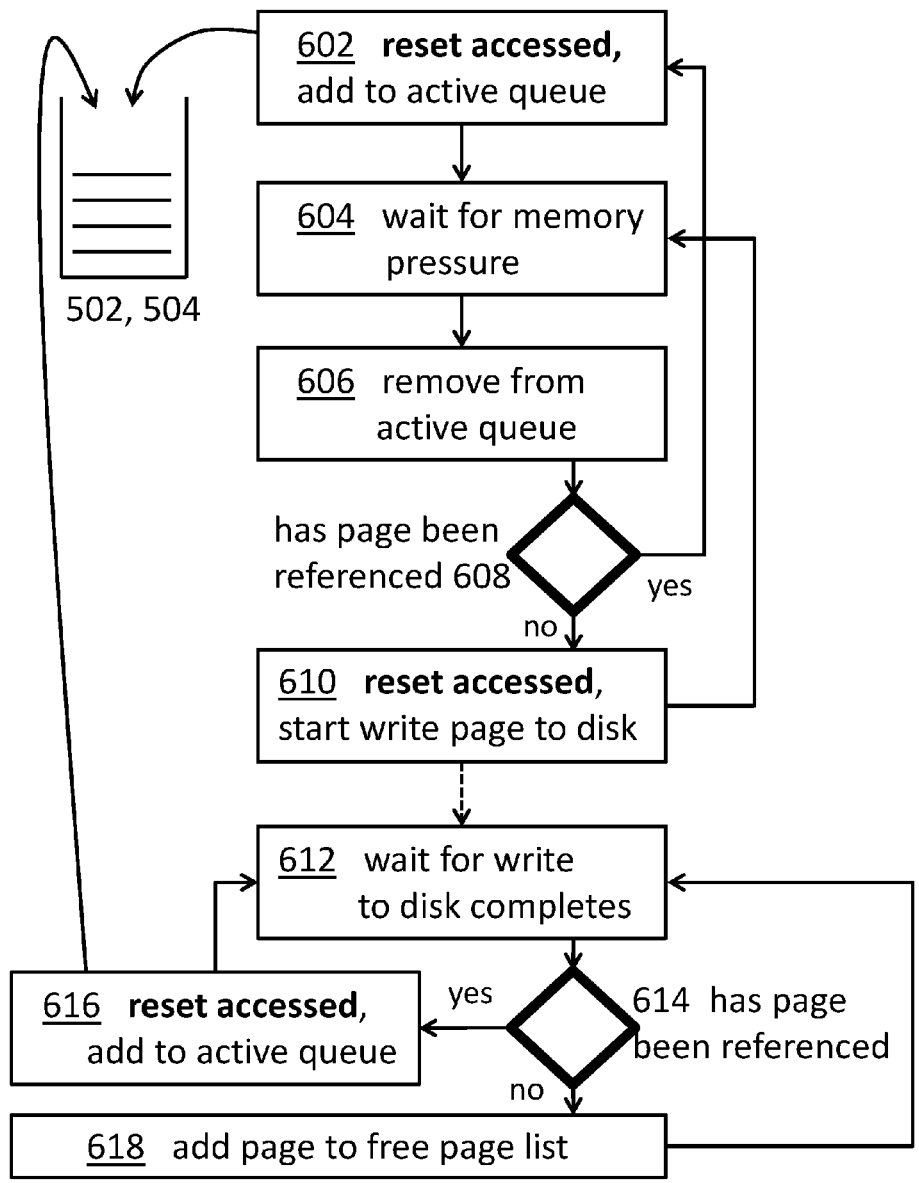
FIG. 6 shows a flowchart supporting the check-in-cache instruction method in accordance with some embodiments of this disclosure.

FIG. 6 shows the just described embodiment as flowchart. Reference numerals 502, 504 symbolize the active queue 502 and the inactive queue of FIG. 5. If a new PTE is added to the page table, the reference bit (here, "accessed") is reset 602. Then, the caching algorithm may wait 604, until the memory gets under pressure, i.e., the cache does not provide enough memory cells to cache main memory page frames. At this stage 606 a PTE may be removed from the active queue 502. At that point in time, it may be determined 608 whether the page may have been referenced, i.e., accessed since the PTE has been added to the active queue 502. In case of "yes", the process starts from the beginning 602.

In case of "no" the referenced bit or access bit may be reset 610 and a write to disk of the memory page may be started. The back arrow from block 610 to block 604, i.e., "wait for memory pressure", may indicate that the process has to wait for the "write page to disk" 610 to complete (I/O completion). In practical terms, the PTE may again be added to the head 504a of the inactive list 504 for a second round on the inactive list 504 assuming that the I/O has been completed when the PTE reaches the tail 504b if the inactive list again.

As shown at block 612, the process waits for the write to disk to be completed. Then, it may again be determined 614 whether the page has been accessed, i.e., referenced since the entry into the inactive queue 504. In case of "no", the page may be added 618 to the free pages list. In case of "yes", the referenced bit may be reset 616 (reset "assessed") and the PTE may be added again to the head 502a of the active queue 502.

A person skilled in the art may understand that the actions "reset accessed" in blocks 602, 610 and 616 as well as the two determinations of whether the page has been accessed at 608, 614 are different than contemporary methods.

Figure 7:
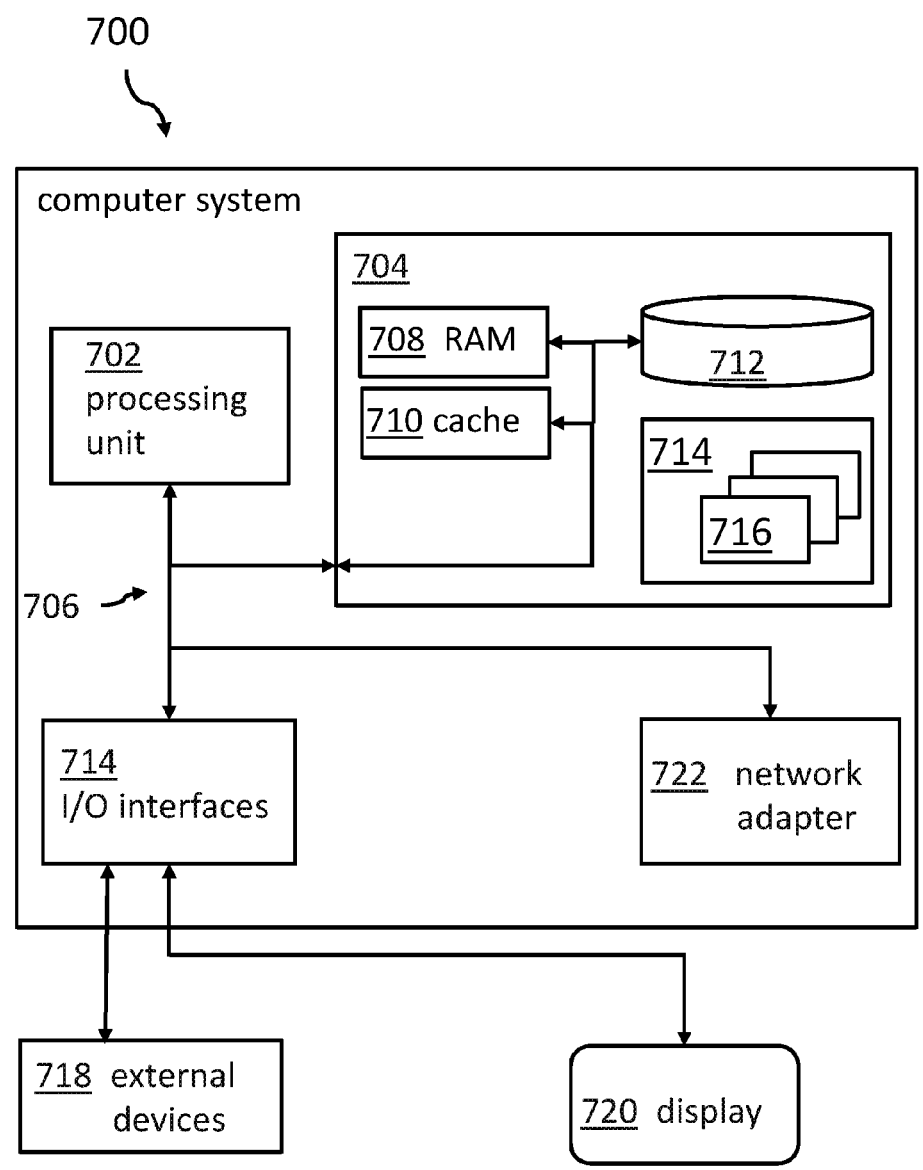
FIG. 7 shows a computing system for implementing some embodiments of this disclosure.

Embodiments of the invention may be implemented together with virtually any type of modified computer, regardless of the platform being suitable for storing and/or executing program code. FIG. 7 shows, as an example, a computing system 700 suitable for executing program code related to the proposed method.

The computing system 700 is only one example of a suitable computer system and is not intended to suggest any limitation as to the scope of use or functionality of embodiments of the invention described herein. Regardless, computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both local and remote computer system storage media including memory storage devices.

As shown in the FIG. 7, computer system/server 700 is shown in the form of a general-purpose computing device. The components of computer system/server 700 may include, but are not limited to, one or more processors or processing units 702, a system memory 704, and a bus 706 that couples various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the invention.

Program/utility 714, having a set (at least one) of program modules 716, may be stored in memory 704 by way of example, and not limitation, as well as an operating system, one or more application programs, other program modules, and program data. Each of the operating system, one or more application programs, other program modules, and program data or some combination thereof, may include an implementation of a networking environment. Program modules 716 generally carry out the functions and/or methodologies of embodiments of the invention as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of computer system/server 700 via bus 706. It should be understood that although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

The present invention may be embodied as a system, a method, and/or a computer program product. The computer program product may include a computer readable storage medium (or media) having computer readable program instructions thereon for causing a processor to carry out aspects of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:
a memory having computer readable instructions, the memory including a main memory;
a processor cache for the main memory; and
a processor for executing the computer readable instructions, the computer readable instructions comprising:
receiving a check-in-cache instruction from a check-in-cache instruction storage location; and
responsive to receiving the check-in-cache instruction, determining whether data bytes specified by the check-in-cache instruction are at least partially available in the processor cache without accessing the processor cache data or loading data to the processor cache,
storing a condition code of the determination result in a storage location.

2. The computer system according to claim 1, wherein the storage location is a processor register, a processor flag or a main memory location.

3. The computer system according to claim 1, wherein the processor cache comprises at least two hierarchy levels, the hierarchy level directly caching the main memory is an inclusive cache, and the determining is based on a determination of whether the data bytes are contained in the hierarchy level directly caching the main memory.

4. The computer system according to claim 1, wherein the processor cache comprises at least two hierarchy levels including a first and a second level, the hierarchy level directly caching the main memory is a non-inclusive cache, and the determining is based on a determination of whether the data bytes are contained in the first hierarchy level or in the second hierarchy level directly caching the main memory.

5. The computer system according to claim 1, wherein the processor comprises a plurality of nodes, each node comprising a plurality of processor chip units, each processor chip unit comprising a plurality of processing cores, wherein each node comprises a local cache controller.

6. The computer system according to claim 5, wherein the local cache controller has priority for a determination of whether a memory page is cached.

7. The computer system according to claim 1, wherein a determination of whether to perform a check-in-cache instruction or to perform a reference bit check for a paging decision is performed by an operating system module.

8. The computer system according to claim 7, wherein the determination performed by the operating system module is dependent on a page turn-over rate.

9. The computer system according to claim 1, wherein the main memory content is managed according to a least recently used concept.

10. The computer system according to claim 1, wherein page memory table entries are organized according to a second chance least recently used algorithm.

11. The computer system according to claim 1, wherein the check-in-cache instruction returns a result of a determination of an availability of a memory page or parts thereof without loading the memory page to the processor cache if the memory content is not in the processor cache.

12. The computer system according to claim 11, wherein in case the check-in-cache instruction result is indicative of a non-availability of the memory page or parts thereof in the processor cache of the main memory, a reference bit check is performed in the page table entries or a storage key of a physical memory page.

13. The computer system according to claim 11, wherein the reference bit check is only performed in an inactive list of the page table entries or in the storage key of a physical memory page.

14. The computer system according to claim 1, wherein the check-in-cache instruction specifies a subsequent number of data bytes stored in the main memory.

15. A method for a memory management in a computer system comprising a processor, a main memory and a processor cache for the main memory, the method comprising:
receiving a check-in-cache instruction from a check-in-cache storage location;
determining, responsive to receiving the check-in-cache instruction, whether data bytes specified by the check-in-cache instruction are at least partially available in the processor cache without accessing the processor cache data or loading data to the processor cache; and
storing a condition code of the determination result in a storage location.

16. The method according to claim 15, wherein the storage location is a processor register, a processor flag or a main memory location.

17. The method according to claim 15, wherein one of:
the processor cache comprises at least two hierarchy levels, the hierarchy level directly caching the main memory is an inclusive cache, and the determining is based on a determination of whether the data bytes are contained in the hierarchy level directly caching the main memory; and
the processor cache comprises at least two hierarchy levels, a first and a second level, the hierarchy level directly caching the main memory is a non-inclusive cache, and the determination is based on a determination of whether the data bytes are contained in the first hierarchy level or in the second hierarchy level directly caching the main memory.

18. The method according to claim 15, wherein a determination whether to perform a check-in-cache instruction or to perform a reference bit check for a paging decision is performed by an operating system module.

19. A computer program product for a memory management in a computer system comprising a processor, a main memory and a processor cache for the main memory, the computer program product comprising a computer readable storage medium having program instructions embodied therewith, the program instructions being executable by the computer system to cause the computer system to:
receive a check-in-cache instruction from a check-in-cache storage location;
determine, responsive to receiving the check-in-cache instruction, whether data bytes specified by the check-in-cache instruction are at least partially available in the processor cache without accessing the processor cache data or loading data to the processor cache; and
store a condition code of the determination result in a storage location.

* * * * *